United States Patent [19]

Fally

[11] 4,120,663
[45] Oct. 17, 1978

[54] HYDROGEN GENERATING DEVICE
[75] Inventor: Jacques Fally, Orsay, France
[73] Assignee: Compagnie General d'Electricite S.A., Paris, France
[21] Appl. No.: 713,957
[22] Filed: Aug. 12, 1976
[30] Foreign Application Priority Data
Aug. 27, 1975 [FR] France .................. 75 26389
[51] Int. Cl.² ................................ B01J 7/00
[52] U.S. Cl. ........................ 422/198; 55/16; 55/158; 423/644; 422/202; 422/239
[58] Field of Search ...................... 23/281; 55/16, 158; 204/195 S, 59, 252, 265, 262, 295; 126/270, 271; 60/641; 176/39

[56] References Cited
U.S. PATENT DOCUMENTS

| 549,765 | 11/1895 | Calver ................................ 23/281 X |
| 3,070,703 | 12/1962 | Podolny ........................ 126/270 C X |
| 3,350,176 | 10/1967 | Green et al. ........................ 55/158 X |
| 3,400,054 | 9/1968 | Raka et al. .................. 204/195 S X |
| 3,901,669 | 8/1975 | Seitzer ............................. 23/281 X |

Primary Examiner—James H. Tayman, Jr.
Attorney, Agent, or Firm—Sughrue, Rothwell, Mion, Zinn and Macpeak

[57] ABSTRACT

Concentric closed tubes define an outer steam vessel with the inner tube constituted by a selective membrane consisting of a metallic oxide having a first doping to effect passage of oxygen ions through the membrane to the interior of the inner tube acting as an oxygen collector and having a second doping to effect return conduction of electrons through said membrane to increase heating of the steam. A vacuum pump is applied to the interior of the inner tube to provide a pressure differential to facilitate oxygen passage through the membrane.

14 Claims, 1 Drawing Figure

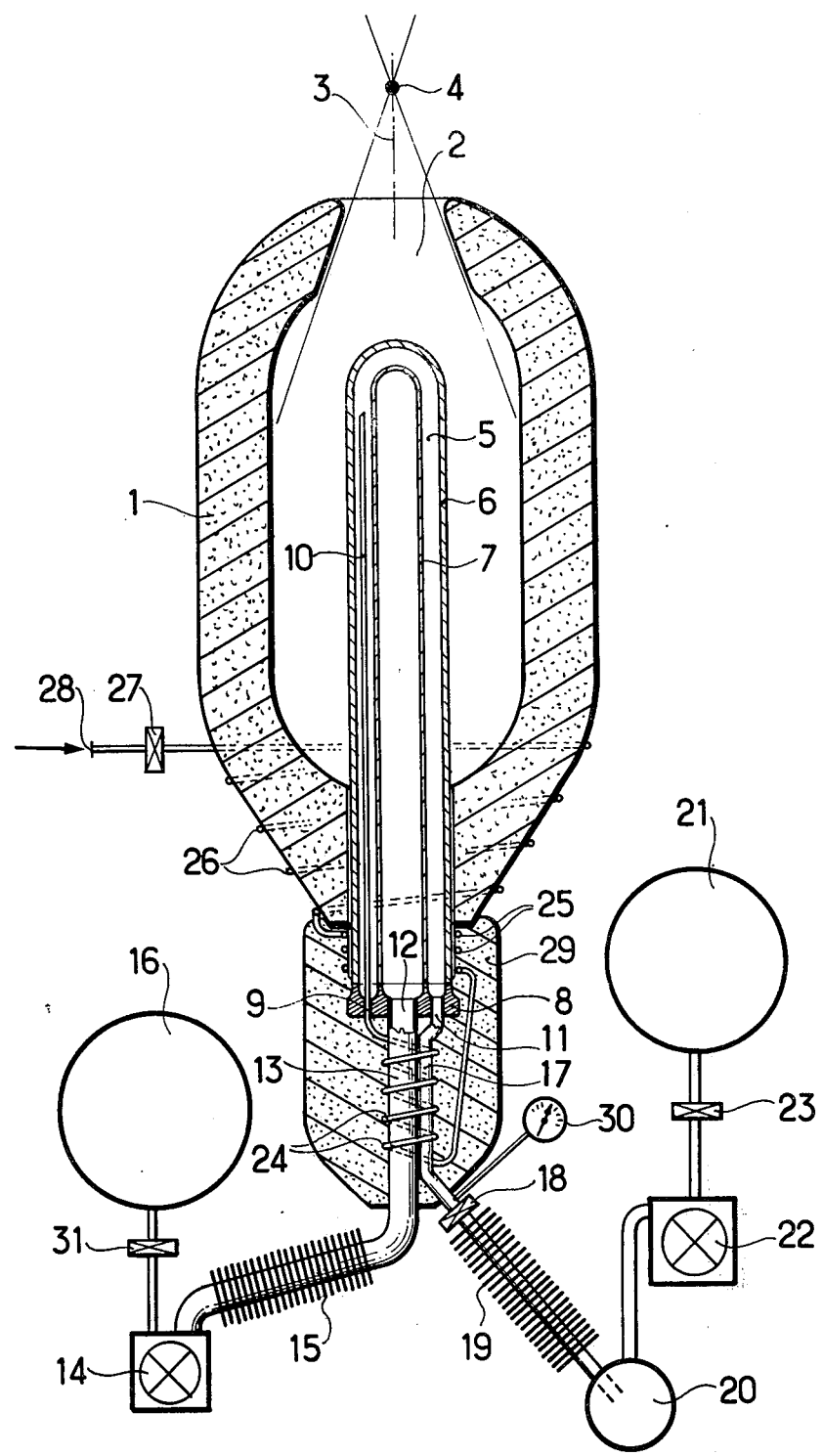

HYDROGEN GENERATING DEVICE

The present invention relates to a hydrogen generating device.

Considering the probable exhaustion in the relatively near future of currently used energy reserves and the increase in price of fuels such as crude oil, attempts have been made to find other sources of energy. Hydrogen, which can be obtained from water appears to be a particularly advantageous fuel: indeed, it can provide electric energy by means either of gas turbines or of fuel cells, or direct mechanical energy by means of hydrogen motors; furthermore, hydrogen can easily be stored under pressure, in liquid form or even by absorption in some metals, in the form of hydrides.

It is known that it is possible to obtain hydrogen by water electrolysis, however, this generating method has the disadvantage of low efficiency. The efficiency of the electrolysis reaction is about 0.7 and the fuel efficiency of the electric energy generation necessary for the reaction is in the order of 0.3.

It is known that it is possible also to obtain hydrogen by decomposition of steam at high temperature. For example, a device operating by decomposition of steam into oxygen and hydrogen in an enclosure heated to a high temperature is known, the hydrogen thus obtained being extracted by diffusion of the oxygen through a zirconia membrane. The diffusion of oxygen is accelerated by means of a reaction with a reducing gas or by flushing with a neutral gas.

The above-mentioned device has drawbacks. Indeed, the membranes used do not make it possible to ensure a sufficient diffusion of oxygen and stable operation. Moreover, the acceleration of the oxygen diffusion by the above-mentioned means is very small when a neutral gas is used and it draws from the stocks of exhaustible fuels when reducing gas is used; there is also a possible danger of pollution.

Preferred embodiments of the present invention mitigate these drawbacks and provide hydrogen generating devices having high efficiency, which do not pollute and are stable in operation.

The present invention provides a device for generating hydrogen comprising: a steam vessel; means for introducing steam into the steam vessel; means for heating steam contained in the vessel to a temperature sufficient for decomposing at least some of the steam into hydrogen and oxygen; an oxygen passing membrane forming at least part of the wall of the steam vessel, said membrane being constituted by a metallic oxide doped to obtain both the passage of oxygen ions through the membrane and the return conduction of electrons through the membrane; means for maintaining a reduced oxygen pressure on the side of the membrane exterior to the vessel to cause oxygen to leave the vessel by passing through the membrane; and means for collecting the hydrogen remaining in the vessel.

An embodiment of the invention is described below by way of example with reference to the accompanying drawing, in which the single FIGURE is an elevation in partial section of an embodiment of the device according to the invention.

The device shown in the FIGURE comprises a furnace in the form of a sleeve 1 with a vertical axis. The walls of the furnace are preferably made of zirconia wood or alumina wool. The heat for heating the inside of the furnace to a temperature between 1800 and 2500° C. (preferably equal to about 2200° C.) enters through a top opening 2 of the sleeve 1. In the example shown in the FIGURE, this heat is supplied in the form of a conical beam 3 of solar energy coming from a concentration point 4 of a system of mirrors, (not shown). The solar energy concentrated at one point by mirrors could also be conveyed from the concentration point to the inside of the furnace by a system of light-wave guides. Of course, it is also possible to heat the inside of the furnace by other means, for example by combustion of powdered coal, or possibly by means of nuclear fusion.

The sleeve 1 at least partly surrounds a reaction enclosure constituted by a double wall tube 5 having an outside wall 6 which is impassable by either hydrogen or oxygen, and which can be made of stabilized zirconia. In the device shown in the FIGURE, the wall 6 is a tube closed at its top end, the axis of this tube being identical to that of the sleeve 1. The inside volume of the tube 5 is limited by an inside wall 7 constituted by a tube which is coaxial to the tube 6 and closed at its top end. The wall 7 is a selective membrane made of a metallic oxide doped to obtain ionic conduction of oxygen and electronic conduction.

The sleeve 1 is disposed round the middle and top part of the tubular wall 6. It has a bottom opening which surrounds and engages the tube 6, so that the bottom end of the tube when wall 6 projects outside the furnace.

The bottom part of the tube 5 comprises a base 8 made of stainless steel for example, this base being provided with an inlet 9 and an outlet 11. The inlet 9 is extended inside the tube 5 along a part of its length by a tube 10. The inlet 9 and the outlet 11 enable the circulation of the gas in the tube 5 and are preferably situated on either side of the inside tube wall 7. The base 8 also includes an opening 12 suitable for making the inside volume of the wall 7 communicate through a pipe 13 with a primary vacuum pump 14, such as a vane pump. The pipe can include a cooling system 15. The output of the pump 14 is directed towards a tank 16 through a valve 31.

The outlet 11 of the tube 5 is connected by a pipe including a valve 18 and cooling system 19, to a condensation chamber 20, which is itself connected to a tank 21 through a primary vacuum pump 22; a valve 23 is disposed between the pump 22 and the tank 21.

A heat exchanger 24 collecting the heat from the gases sucked in by the pumps 14 and 22 comprises a tube which winds round a part of the pipes 13 and 17, close to the opening 12 and to the outlet 11. One end of this tube is connected to the inlet 9 of the tube 5. The other end of the heat exchanger tube is connected to the outlet of another heat exchanger 25 constituted by a tube wound round the bottom part of the tubular wall 6.

The inlet of the exchanger 25 is connected to one end of a tube 26 wound externally round the bottom part of the furnace sleeve 1, the other end of the tube 26 being connected by a valve 27 to a water inlet 28.

In order to limit as much as possible the losses of heat from the exchangers 24 and 25, an insulating wall 29 is disposed round these exchangers.

The device shown in the FIGURE operates as follows:

The inside of the sleeve 1 being heated to a temperature of 2200° C. under the effect of the beam 3 and the valve 27 being open, water is brought in through the inlet 28 in the tube 26, for example at a constant flow rate. This water is preferably distilled in order to avoid scaling the device. Although this disposition is not shown in the FIGURE, this distilled water can, before being brought through the inlet 28, be heated by circulation on the cooling systems 15 and 19, the heat necessary for distillation possibly coming from the heat losses of the furnace 1 in a further system which is not shown.

The water which circulates in the tube 26 is heated firstly by contact with the outside wall of the sleeve 1 then, entering the tubes of the heat exchanger 25, in contact with the bottom part of the tube 6. The water leaving the heat exchanger 25 is already in the form of steam. The steam is superheated by passing through the heat exchanger 24 and it can be considered that this steam is at about 800° C. when it reaches the inlet 9 of the tube 5.

The temperature of the superheated steam increases further as it passes along the tube 10 inside the tube 5; it is substantially equal to the inside temperature of the furnace, i.e. 2200° C., when it leaves the tube 10 at the top part of the tube 5. The steam reaching the tube 5 is decomposed into hydrogen and oxygen according to the well-known reaction: $H_2O \rightarrow H_{2\rightarrow} + \frac{1}{2} O_2$.

An electrochemical process for the separation of the oxygen thus obtained takes place along the inside wall 7 of the tube 5. This process causes the oxygen to be diffused through the wall 7 and may be analysed into a transversal ionic current which enables the diffusion of the oxygen contained in the tube 5 through the wall 7 and into an electronic current which is also transversal in the opposite direction. This electronic current heats the wall 7, this saving energy. The selective membrane constituting the wall 7 is made of a metallic oxide doped so as to be able to have this mixed conduction. The metallic oxide is preferably zirconia $ZrO_2$. The doping which enables ionic conduction consists in the addition of traces of yttrium oxide $Y_2O_3$ or of calcium oxide CaO. The doping which enables electronic conduction consists in the addition of iron oxide $Fe_3O_4$, or uranium oxide $UO_2$ or cerium oxide $CeO_3$ or a mixture of these oxides to the zirconia. In other words one doping enables an electron to be added to an oxygen molecule for it to pass through the membrane and the other doping enables the electron to return after the oxygen molecule has passed through the membrane. The double doping thus keeps the membrane in electrical equilibrium.

The greater the difference in concentration of oxygen on either side of the membrane, the greater is the diffusion of oxygen through the selective membrane.

That is why the pressure is reduced adjacent the wall 7 by means of the vacuum pump 14. The oxygen which diffuses through the membrane is stored in the tank 16; it is an advantageous by-product of the device.

The oxygen coming from the decomposition of the steam contained in the tube 5 is therefore permanently removed, this causing a continuous movement of the equilibrium point of the reaction $H_2O \rightarrow H_2 + \frac{1}{2} O_2$.

Due to this equilibrium movement, it becomes possible to decompose virtually all of the steam contained in the tube 5. The difference in pressure of the oxygen on either side of the membrane 7 is sufficiently great for practically only pure hydrogen to remain at the outlet 11 of the tube 5.

This hydrogen is stored for example under pressure in the tank 21 by means of the pump 22, the traces of non-decomposed water being condensed in the condenser 20.

Another mode of operation of the device shown in the FIGURE, called the cycle mode, differs from the continuous operation described above by the following details.

In a first cycle, a given quantity of water is injected at 28, after the tube 5 has been evacuated, the valves 27 and 31 being open and the valve 18 being closed. Then the valve 27 is closed and the oxygen is pumped by starting up the pump 14. The progress of the decomposition of the steam contained in the tube 5 can be followed by observing the evolution of the pressure of the gases at the output 11 of the tube 5 by means of a pressure gauge 30 disposed on the pipe 17.

When the pressure indicated by the pressure gauge 30 stabilizes the valves 18 and 23 are opened and the hydrogen produced in the tube 5 is pumped out until this tube is evacuated.

A second cycle identical to the first cycle can then be started.

The device described above and illustrated in the FIGURE makes it possible to obtain hydrogen production at a rate of up to 70 liters per hour per square centimeter of the selective membrane. The volume of oxygen diffused through the membrane can reach 35 liters per hour per square centimenter, these figures being reduced to N.T.P.

The theoretical efficiency of the device, i.e. the ratio between the energy available from the hydrogen produced and the energy spent in heating and dissociating the water is in the order of 0.85. Taking into consideration the energy spent in the pumping of the gases, the theoretical efficiency is in the order of 0.60.

It should be observed that for its operation, this device consumes only water, stocks of which are virtually inexhaustible, as well as thermal and mechanical energy which can both be obtained from solar energy.

The device according to the invention can be applied to the storing of hydrogen under pressure or in liquid form, in order to supply an electric power station comprising gas turbines, in order to fuel hydrogen motors or to ensure combustion in general.

What is claimed is:

1. In a hydrogen generating device including:
    a steam vessel comprising spaced first and second walls and including closure means closing off said walls and forming with said walls a steam decomposition chamber;
    tube means for introducing steam into said steam vessel decomposition chamber;
    furnace means for heating said steam within said steam vessel to a temperature sufficient to decompose at least some of said steam into hydrogen and oxygen, an oxygen passing membrane forming said second wall;
    collector means exterior of said vessel and connected to said steam vessel for collecting hydrogen,
    the improvement wherein:
    said membrane comprises a double doped metallic oxide including a first doping to effect passage of oxygen ions through said membrane and a second doping different from said first doping to effect return conduction of electrons through said membrane, and wherein the amount of said second doping is sufficient keep the membrane in electronic equilibrium,
    a third wall, said third wall and second second wall defining an oxygen collecting chamber;
    vacuum pump means connected to said oxygen collection chamber for maintaining a reduced pressure on the side of said membrane exterior of said vessel to cause oxygen to pass through said membrane for collection; and means exterior of said oxygen collecting chamber and connected to said pump means for collecting oxygen.

2. A device according to claim 1, wherein said vessel comprises concentric inner and outer tubes, the outer tube constituting the first wall of said steam vessel and said inner tube constituting said second wall thereof, said tubes being individually closed off at the top end and having their bottom ends sealably joined by said third wall forming a common closure means for both chambers.

3. A device according to claim 2, wherein said means for introducing steam into said steam vessel comprises a pipe passing through the bottom end of said vessel and rising to a level near the top of said vessel and extending between said inner and outer tubes.

4. A device according to claim 3 wherein said means for collecting hydrogen from said vessel comprises an outlet tube open to the interior of said vessel at its bottom end and being disposed on the side of said inner tube opposite to that of said steam inlet pipe, and wherein a vacuum pump is connected to said outlet tube and to a hydrogen storage tank.

5. A device according to claim 1 wherein the means for collecting the hydrogen comprises a vacuum pump with its inlet connected to the steam vessel and with its outlet connected to a hydrogen storage tank.

6. A device according to claim 1 wherein said furnace means comprises a thermally insulating sleeve concentrically surrounding said steam vessel and means for injecting heat into said sleeve for impingement on said steam vessel, and wherein a water circulation pipe is wrapped around a lower end of the steam vessel, the lower end of said concentric tubes and about said oxygen collection pipe and said hydrogen collection tube and is integral with said pipe which extends through the bottom end of said steam vessel for introduction of steam into the same such that water is preheated by circulation within said water circulation pipe wrapped about said thermally insulating shield, is transformed into steam at the level of said steam vessel and is superheated at the level of said oxygen collection pipe and said hydrogen collection tube.

7. A device according to claim 9 including thermal insulation disposed around the water circulation pipe over that portion which is wrapped about said oxygen collection pipe and said hydrogen collection tube.

8. A device according to claim 1 wherein the means for heating the steam to a decomposition temperature comprises a thermally insulating sleeve disposed around the steam vessel and means for injecting heat into the sleeve.

9. A device according to claim 8 including a water supply pipe wrapped around the outside of the thermally insulating shield to pre-heat water before it is turned into steam.

10. A device according to claim 8 wherein the means for injecting heat into the sleeve comprises means for bringing the temperature inside the sleeve to at least 1800° C.

11. A device according to claim 1 wherein the metallic oxide of the membrane is zirconia.

12. A device according to claim 1 wherein the doping of said membrane to obtain the passage of oxygen ions is yttrium oxide $Y_2O_3$.

13. A device according to claim 1 wherein the doping of said membrane to obtain conduction of electrons is iron oxide $Fe_3O_4$.

14. A device according to claim 1 wherein parts of the steam vessel wall which are not used as the oxygen-passing membrane are made of stabilised zirconia.

* * * * *